(12) United States Patent
Roussie et al.

(10) Patent No.: US 7,661,727 B2
(45) Date of Patent: Feb. 16, 2010

(54) THREADED TUBULAR CONNECTION WHICH IS RESISTANT TO BENDING STRESSES

(75) Inventors: Gabriel Roussie, Cappelle en Pevele (FR); Jacky Massaglia, Saint-Saulve (FR)

(73) Assignees: Vallourec Mannesmann Oil & Gas France, Aulnoye-Aymeries (FR); Sumitomo Metal Industries, Ltd., Osaka-shi (JP)

( * ) Notice: Subject to any disclaimer, the term of this patent is extended or adjusted under 35 U.S.C. 154(b) by 488 days.

(21) Appl. No.: 10/594,112

(22) PCT Filed: Mar. 22, 2005

(86) PCT No.: PCT/EP2005/003086
§ 371 (c)(1),
(2), (4) Date: Sep. 25, 2006

(87) PCT Pub. No.: WO2005/093309
PCT Pub. Date: Oct. 6, 2005

(65) Prior Publication Data
US 2007/0187951 A1    Aug. 16, 2007

(30) Foreign Application Priority Data
Mar. 26, 2004 (FR) .................................. 04 03147

(51) Int. Cl.
*F16L 25/00* (2006.01)
(52) U.S. Cl. ..................................................... 285/333
(58) Field of Classification Search ................. 285/333, 285/334
See application file for complete search history.

(56) References Cited

U.S. PATENT DOCUMENTS

| 1,942,518 | A |   | 1/1934  | Protin            |         |
|-----------|---|---|---------|-------------------|---------|
| 2,992,613 | A |   | 7/1961  | Bodine            |         |
| 3,224,799 | A |   | 12/1965 | Blose et al.      |         |
| 4,384,737 | A |   | 5/1983  | Reusser           |         |
| 4,796,923 | A | * | 1/1989  | Liggins et al.    | 285/27  |
| 4,915,426 | A |   | 4/1990  | Skipper           |         |
| 4,946,201 | A | * | 8/1990  | Tai               | 285/94  |
| 5,964,486 | A | * | 10/1999 | Sinclair          | 285/331 |
| 6,056,324 | A | * | 5/2000  | Reimert et al.    | 285/18  |
| 6,494,499 | B1| * | 12/2002 | Galle et al.      | 285/334 |
| 6,511,102 | B2| * | 1/2003  | Krug et al.       | 285/333 |
| 6,543,816 | B1| * | 4/2003  | Noel              | 285/333 |

(Continued)

FOREIGN PATENT DOCUMENTS

JP            07063289         3/1995

*Primary Examiner*—David E Bochna
(74) *Attorney, Agent, or Firm*—Oblon, Spivak, McClelland, Maier & Neustadt, L.L.P.

(57) ABSTRACT

A threaded tubular connection includes a male tubular element including a male threaded portion and a female tubular element including a female threaded portion that cooperates by screwing with the male threaded portion. The threaded connection includes at least one transfer zone that can transfer bending loads between the elements and that is axially spaced from the threaded portions, in which the male and female elements have an undulating surface and a smooth surface facing each other, the undulating surface defining a series of rounded annular ribs that come into contact with the smooth surface with a radial interference fit. The connection may find application to production strings for hydrocarbon wells.

30 Claims, 2 Drawing Sheets

U.S. PATENT DOCUMENTS

| | | |
|---|---|---|
| 6,752,436 B1 * | 6/2004 | Verdillon .................... 285/333 |
| 6,957,834 B2 * | 10/2005 | Maeda ....................... 285/333 |
| 6,971,681 B2 * | 12/2005 | Dell'Erba et al. ............. 285/55 |
| 7,334,821 B2 * | 2/2008 | Dutilleul et al. ............. 285/333 |
| 7,506,900 B2 * | 3/2009 | Carcagno et al. ............ 285/333 |
| 2002/0017788 A1 | 2/2002 | Krug et al. |
| 2003/0067169 A1 | 4/2003 | Church |

* cited by examiner

THREADED TUBULAR CONNECTION WHICH IS RESISTANT TO BENDING STRESSES

BACKGROUND OF THE INVENTION

The invention relates to a threaded tubular connection for a tubular string which is subjected to dynamic bending loads, comprising a male tubular element provided with a male threaded portion and a female tubular element provided with a female threaded portion.

That type of threaded connection is intended for making strings for hydrocarbon or the like wells.

DISCUSSION OF THE BACKGROUND

In addition to relatively constant (static) axial tensile loads, under the action of waves, the wind, the tides and sea currents, strings connecting an offshore platform to the sea bed are subjected to variable (dynamic) bending loads. Said loads are transmitted from one tube to the next in the sting through the threaded connections.

FIG. 3 shows that the last threads of the male element and the female element are subjected to a maximum bending moment which has to be transmitted in addition to the whole of the axial tensile load.

This results in dynamic tensile loads known as repeated loads at the root of the last threads, and more particularly the last male threads, which initiates fatigue cracking at that location leading to catastrophic rupture of the string.

International patent applications WO-A-01/75345 and WO-A-01/75346 describe solutions for reducing stresses at the roots of said threads, but the resulting improvement may prove insufficient.

Said dynamic loads also cause friction between the parts of the male and female elements in contact, leading to cracking due to fretting fatigue.

When one of the tubular elements has an axial abutment surface at its free end which abuts against the other tubular element, the abutment that occurs enables to absorb part of the bending moment. However, to form such abutment surfaces, it is necessary to choose thicker tubes or to increase their thickness locally by upsetting, which introduces increased costs.

SUMMARY OF THE INVENTION

The aim of the invention is to overcome these disadvantages thanks to an appropriate distribution of bending loads and optionally of tensile loads.

The invention also aims to provide spaces to house lubricating grease and the debris resulting from wear of the surfaces in contact.

A further aim is to provide sealing surfaces between the threaded portions and the outside of the threaded connection which do not constitute a source of cracking due to fretting fatigue.

A final aim is to provide multiple sealing surfaces which enable to maintain a seal in the event of deterioration of certain thereof.

In particular, the invention provides a threaded connection of the type defined in the introduction, comprising at least one transfer zone axially disposed between said threaded portions and the free end of one of said tubular elements, it being axially spaced from said threaded portions in order to transfer a fraction of at least 20%, preferably at least 30% of the bending moment to which the connection is subjected from one element to the other, the male and female elements having respective transfer surfaces in mutual contact with a radial interference fit in said transfer zone, at least one of the transfer surfaces being an undulated surface defining a series of annular rounded ribs which come into interfering contact with the facing transfer surface, the maximum diameter point and the minimum diameter point of the undulation profile being located on respective rounded portions of the profile.

Optional characteristics of the invention, which may be complementary or be by substitution, are given below:

said free end of one of the tubular elements has a front surface which is free of contact with the other tubular element;

the axial length of the transfer zone is selected so as to limit the contact pressure resulting from transferring the bending moment to a fraction of the yield strength of the material to less than 1 and preferably less than 0.5;

said male and female transfer surfaces are lubricated;

said facing transfer surface is a smooth surface;

said undulated surface is not in contact with said smooth surface between said ribs;

said two transfer surfaces are undulated surfaces;

the ribs of one transfer surface are housed between the ribs of the facing transfer surface;

said undulated surface or surfaces has/have a periodic profile;

said periodic profile is asymmetric;

said profile forms part of the male transfer surface and is defined by a first convex rounded portion containing a point with a maximum profile diameter, by a second concave rounded portion containing a point with a minimum profile diameter and which is tangential to the first rounded portion, and by a third convex rounded portion which is tangential to the first and second rounded portions and which has a radius which is substantially larger thereof;

the second rounded portion has a larger radius than the first rounded portion;

starting from the free end of the male element, the axial distance between a maximum profile diameter point and the following minimum diameter point of the profile is less than the axial distance between a minimum profile diameter point and the following maximum diameter point of the profile;

the third profile is located between a minimum profile diameter point and the following maximum diameter point of the profile;

the radii of said rounded portions containing the points of maximum profile diameter and of minimum profile diameter are at least equal to 0.4 mm.

the axial distance between 2 consecutive points of maximum profile diameter is at least equal to 1 mm and the axial distance between 2 consecutive points of minimum profile diameter is at least equal to 1 mm.

said radial interference fit is substantially constant from one rib to the other;

said radial interference fit is about 0.4 mm in diameter for a nominal threaded element diameter of 177.8 mm;

said transfer surfaces are in mutual metal/metal sealing contact;

a sealing material in the form of a coating or of an added ring is interposed between the metal surfaces of the male and female elements in the transfer zone;

the male and female transfer surfaces or their envelopes form part of tapered surfaces;

the transfer surfaces or their envelopes are inclined with respect to the connection axis by an angle comprised between 0.5 and 5°.

said undulated surface has a roughness Ra≦3.2 micrometers.

said transfer zone is axially disposed between said threaded portions and the free end of the female element;

the male transfer surface is adjacent to the regular portion of a great length tube at one end of which the male tubular element is formed;

said undulated surface and said smooth surface form part of the male and female elements respectively;

the outer peripheral surface of the female element has a depression which locally reduces its external diameter facing the transfer zone;

said depression has an axially extending concave curvilinear profile facing the transfer zone and either side thereof, said external diameter being minimal substantially facing a median point of the transfer zone and increasing progressively to either side of said point;

said curvilinear concave profile is connected to a chamfer adjacent to the free end of the female element;

said minimum external diameter is such that the bending inertia of the female element in the plane of said minimum diameter is at least equal to the product of the bending inertia $I_{zz}$ of the regular portion of a great length tube at one end of which the male tubular element is formed and the fraction f of the bending moment to be transferred;

said concave curvilinear profile has a radius of curvature of at least 50 mm and preferably at least 100 mm;

the female element forms part of a short coupling each end of which is provided with a female threaded element which can receive a male threaded element forming part of a great length tube for connecting the two tubes.

The invention also provides a process to improve the resistance to fatigue of a threaded tubular connection subjected to dynamic bending loads, said connection comprising a male tubular element with a male threaded portion and a female tubular element with a female threaded portion, characterized in that the connection comprises at least a transfer zone axially located between said threaded portions and the free end of one of said tubular elements while being axially spaced from said threaded portions so as to transfer from one element to the other element a fraction at least equal to 20% of the bending moment undergone by the connection, the male and female elements having in said transfer zone respective transfer surfaces which are in mutual contact and interfere radially, one at least of the transfer surfaces comprising means suited for spacing radially the contact locations from the section where the stresses applied to the connection run, in particular in the form of a series of rounded annular ribs.

BRIEF DESCRIPTION OF THE DRAWINGS

The characteristics and advantages of the invention will now be described in more detail in the following description, made with reference to the accompanying drawings.

DETAILED DESCRIPTION OF THE PREFERRED EMBODIMENTS

Figure 1:
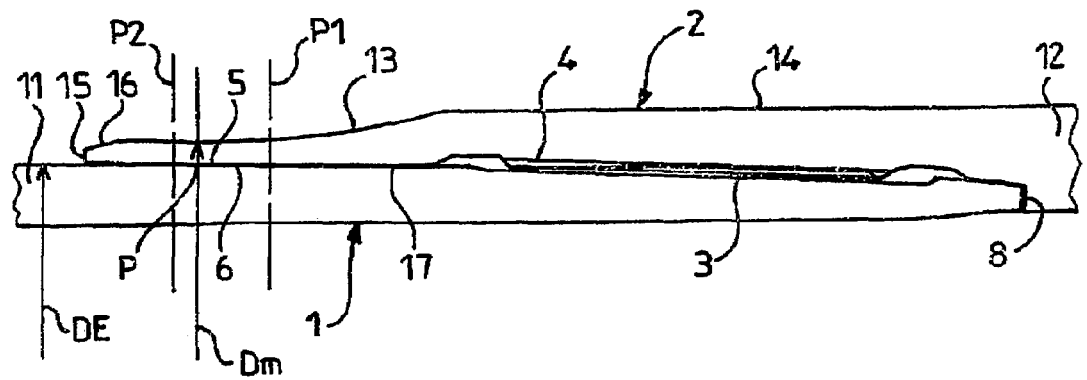
FIG. 1 is an axial half-sectional view of a threaded tubular connection of the invention.

The threaded tubular connection shown in FIG. 1 comprises a male tubular element 1 and a female tubular element 2 provided with respective tapered threaded portions 3, 4 which cooperate for mutual makeup of the two elements. The element 1 is formed at one end of a great length tube 11 and element 2 is formed at one end of a tubular coupling 12 for connecting two tubes similar to 11. A plurality of tubes similar to 11 each one of which has two threaded elements similar to 1 at its ends can then be connected together through couplings similar to 12 each one of which has two threaded elements similar to 2 at its ends to form a string of tubes for an oil well, for example.

In the example shown, tube 11 has between its two male elements i.e. over the major portion of its length, termed the regular portion, a uniform external diameter ED of 177.8 mm (7 inches) which represents the nominal diameter of the threaded connection.

The values for the dimensions given below take this nominal diameter into account and can vary therefrom.

According to the invention, the threaded tubular connection has a transfer zone which is axially defined by transverse planes P1 and P2, in which the male and female elements are in mutual contact through respective annular transfer surfaces 5, 6 of revolution around the axis A of the threaded portions; they have well defined profiles.

Figure 2:
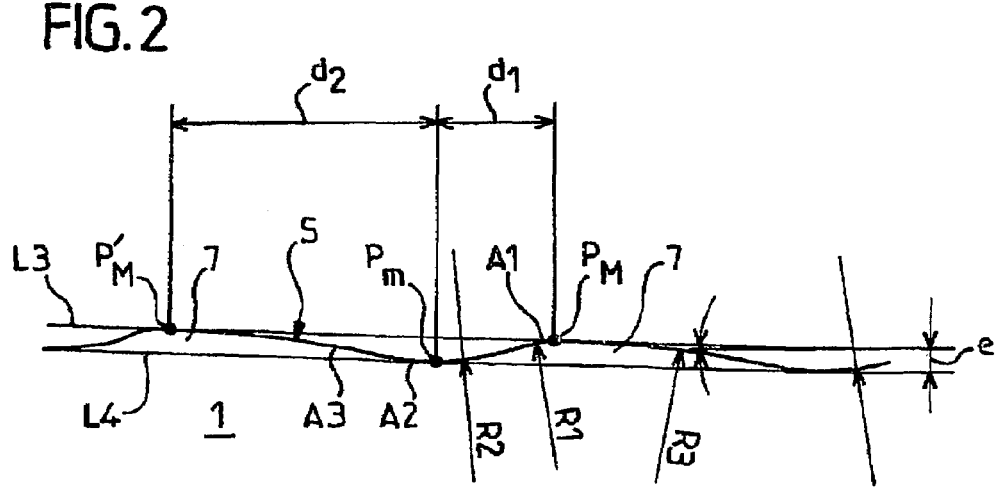
FIG. 2 is a partial axial sectional view on a larger scale of the male element of the threaded connection of FIG. 1, showing a portion of the male transfer surface.

The profile of surface 5 is shown in FIG. 2. The profile is an undulated periodic profile defined by repetition of a motif formed by three mutually tangential circular arcs, namely a first arc A1 which is outwardly convex, i.e. the concavity of which is turned towards the axis A, passing through a point $P_M$ with a maximum profile diameter, a second concave arc A2 (the concavity of which is turned radially outwardly) passing through a point $P_m$ with a minimum profile diameter, and a third convex arc A3, the radii of said three arcs being respectively 0.8, 1.6 and 8 mm in the example shown. The profile of surface 5 is also asymmetric, the axial distance $d_1$ between a point $P_M$ with a maximum profile diameter and the following minimum diameter point $P_m$, starting from the free end 7 of the male element, i.e. from the right in FIG. 2, being less than the axial distance $d_2$ between the point $P_m$ and the following maximum diameter point $P'_M$ of the profile. The distances $d_1$ and $d_2$ in this case are about 1 mm and 2 mm respectively.

The profile of surface 5 is generally inclined with respect to axis A, the straight lines L3 and L4 being respectively tangential to the set of arcs A1 and to the set of arcs A2, and thus constituting the outer and inner envelopes of said profile, being inclined at 2° with respect to said axis, growing closer thereto in the direction of the free end of the male element. Because of said inclination, the terms "maximum diameter point" and "minimum diameter point" refer to maximum and minimum diameters which are relative rather than absolute. The amplitude of the undulations in surface 5, i.e. the radial distance e between lines L3 and L4, is 0.2 mm.

The surface 6 of the female element facing surface 5, not shown in detail, is a tapered smooth surface the slope of which is equal to that of lines L3 and L4, so that the peaks of the different annular ribs 7 defined by surface 5 come into simultaneous contact with surface 6 when screwing the male threaded portion 3 into the female threaded portion 4. Advantageously, the dimensions of surfaces 5 and 6 are such that radial interference occurs at the end of screwing between the peaks of the ribs and the surface 6, said radial interference fit, i.e. the difference in diameter between the male and female elements measured prior to coupling at points which will come into interfering contact after makeup, being uniform from one rib to the other and advantageously being 0.4 mm.

Because of the undulated profile of surface 5, the contact surfaces between the crests of the ribs 7 and the surface 5 are radially spaced from the section defined between the cone the generatrix of which is L4 (internal envelope of the ribs) and the opposed peripheral surface (internal) of the male element 1 where the stresses applied to the connection are fully exerted (i.e. where they run), improving thus the resistance to fatigue of said connection when it is subjected to dynamic bending loads.

Too small an axial distance $d_1+d_2$ (corresponding to the pitch of the ribs), for example smaller than 0.5 mm does not easily enable to form a sufficient undulation amplitude for the rounded portions under consideration. For that reason it is preferable to have an axial distance $d_1+d_2$ over 1 mm. Nevertheless too large an axial distance $d_1+d_2$ does not allow to house several ribs in the transfer zone unless said transfer zone is extended in an excessive way which is not cheaply produced.

Too small an inclination (lower than 0.5°) of the lines L3, L4 makes difficult the sliding of the surfaces 5, 6 one against each other during make up of elements 1, 2 in particular because of the desired interference between the surfaces. An inclination above or equal to 1° is even preferable. An inclination above 5° is not desirable because it reduces too much the critical section of the male element 1 (minimum section of the element on which the whole of the axial loads are exerted on the connection) with respect to the section of the regular portion of the tube 11 and in consequence the efficiency of the connection.

Too low an undulation amplitude, for example lower than 0.5 mm does not allow to distance the section contacts where the axial stresses are exerted neither does it allow to store the wear debris as will be seen further on.

Too big an undulation amplitude reduces the critical section with the drawbacks mentioned above.

Moreover because of the undulated profile there remains between surfaces 5 and 6, between two consecutive ribs 7 annular spaces which can receive lubricating grease and/or debris formed by wear of the threaded elements during dynamic loadings.

Further, each rib 7 defines an annular sealing contact surface with the surface 6, the multiplicity of said sealing surfaces reducing the risk of loss of a seal between the threaded portion zone 3, 4 and the outside of the threaded connection. This seal can be produced by direct contact of the constituent metallic materials of the male and female elements. In a variation, a sealing material such as an elastomer or a softer metal than that of the male and female elements (for example copper on steel) may be interposed between the substrate materials in the form of a coating or of an added ring. A further possibility consists of subjecting one and/or other of the contact surfaces to a surface treatment which encourages a seal.

Too small a radial interference between the crests of the ribs and surface 6 does not allow a seal between surfaces 5 and 6. Too large a radial interference risks inducing galling between surfaces 5 and 6 during make up, which galling is detrimental to the behavior to fatigue of the connection and to the seal between surfaces 5 and 6.

In order to obtain a good seal between surfaces 5 and 6, it is preferable to master the roughness of said surfaces. A roughness Ra>3.2 micrometers is not desirable. For instance one can choose a roughness Ra≦1.6 micrometers.

Figure 3:
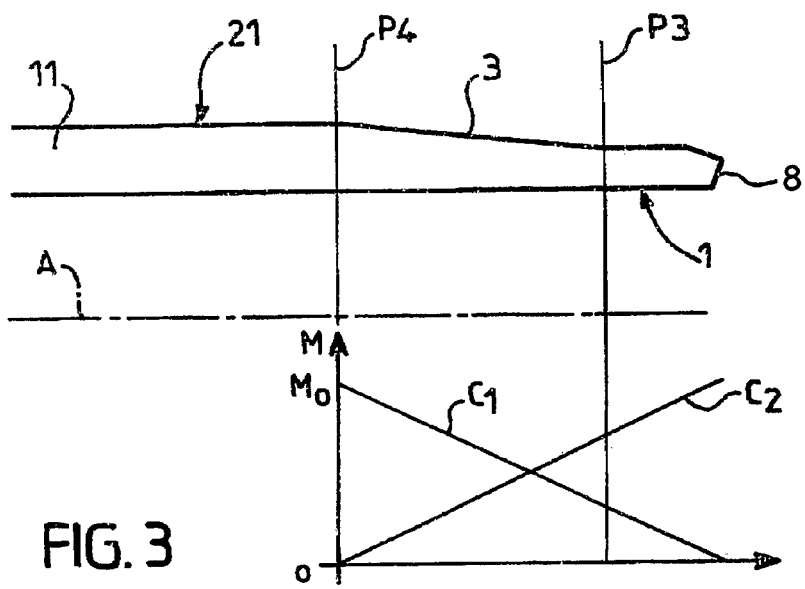
FIGS. 3 and 4 are explanatory diagrams illustrating the distribution of bending moments along the male element and the female element for a prior art threaded connection and for a threaded connection of the invention respectively.
Figure 4:
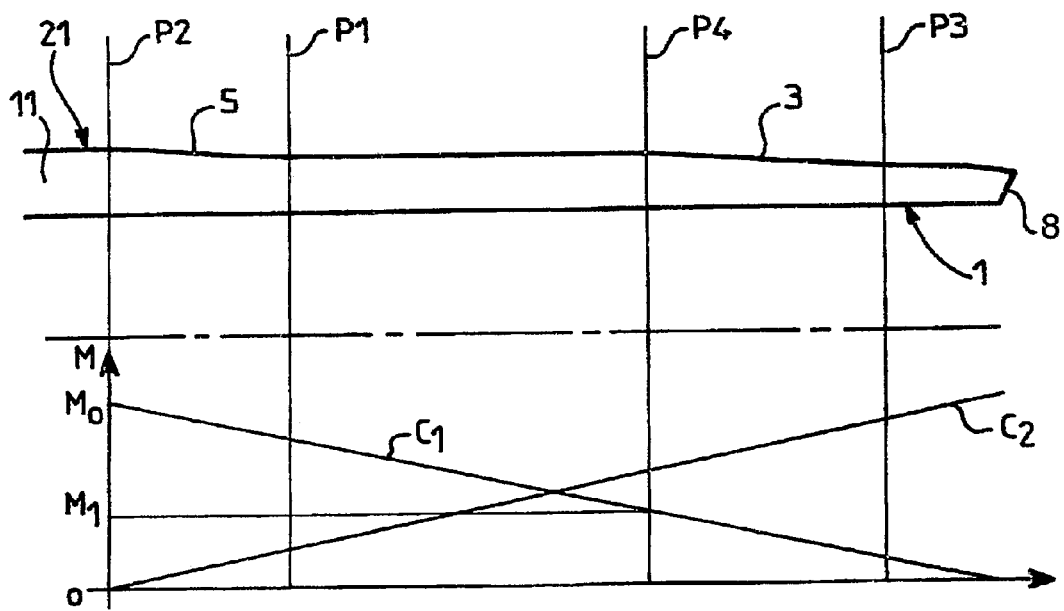

The advantages of the invention are particularly well illustrated in FIGS. 3 and 4, the top part of each of which shows a half-sectional view of the male element of a threaded tubular connection and the lower portion of which shows curves representing the variation along the axis A of the connection of the bending moments experienced by the male and female elements.

In FIG. 3, which pertains to the prior art, male threaded portion 3 extends from a transverse plane P3 close to the free end 8 of the male element 1 to a transverse plane P4 which is directly followed by the regular portion 21 of the tube 11 to which the male element 1 belongs. When a bending load is applied to the tubular connection of which element 1 forms a part, this latter experiences a bending moment which varies along the axis A, following the curve C1, shown as a straight line. This moment M has a maximum value $M_0$ in the plane P4. Conversely, the bending moment experienced by the female element, not shown, varies as the curve C2, shown as a straight line, that moment being zero in the plane P4 and increasing progressively in the direction of the free end 8.

In FIG. 4, which pertains to the invention, the bending moment M experienced by the male element 1 takes a maximum value $M_0$ in the plane P2 which separates the transfer surface 5 and the regular portion 21 of the tube 11. The bending moment experienced by the threaded portion 3 has a maximum value $M_1$ in the plane P4 which defines the threaded portion 3 opposite the free end 8 of the male element. The further the transfer zone 5, 6 is spaced from threaded portions 3, 4, and as a result from plane P2 and plane P4, the lower the value $M_1$ with respect to the value $M_0$.

In the case shown in FIG. 4, the maximum diameter of the transfer surface 5 is equal to the diameter of the regular portion 21 of the tube 11.

The example below illustrates the manner by which the axial position of the transfer zone can be determined to obtain the effects sought by the invention.

We shall calculate the distance d between the center of the transfer zone and the center of the threaded portions to transfer a fraction f=0.5 of the bending moment experienced by the connection from one element to the other. This distance is given by equation (1), in which F represents the force on the transfer zone resulting from the bending moment and $M_{max}$ represents the maximum value of the bending moment which can be applied without permanent deformation of the connection:

$$d = \frac{f \cdot M_{\max}}{F} \tag{1}$$

The value $M_{max}$ is given by equation (2) (the formula for the strength of a material) in which YS represents the yield strength of the material of the connection, $I_{zz}$ represents the inertia of the cross section of the connection and OD represents the external diameter of the regular portion 21 of the tube 11:

$$M_{\max} = \frac{YS \cdot I_{zz}}{OD/2} \tag{2}$$

$I_{zz}$ is provided by equation (3), in which ID represents the internal diameter of the threaded connection:

$$I_{zz} = (\pi/64).(OD^4 - ID^4) \tag{3}$$

F equals the product of an area S of the transfer zone and the maximum pressure stress to be applied to this zone, which equals the yield strength YS multiplied by a fraction f' which must not be exceeded.

S is the projection in an axial plane of the surface area in contact in the transfer zone, and is given by equation (4) in the case of a tapered transfer zone in which $D_1$ is the diameter of the cylindrical surface 17 (FIG. 1) of the female element 2 connecting the threaded portion 4 and the transfer surface area 6, and α is the apex half-angle of the tapered surface containing the transfer surfaces 5, 6 and/or their envelopes:

$$S = \frac{(OD + D_1)(OD - D_1)}{4 \cdot tg\alpha} \quad (4)$$

Starting from the following data:
OD=177.8 mm
ID=157.08 mm
$D_1$=175.95 mm
YS=551 MPa
f=0.5
f'=0.3
α=2° the following values can be calculated:
$M_{max}$=119×10⁶ N.mm
S=4685 mm²
D=76.8 mm In the example shown in FIG. 1, this distance represents substantially 150% of the axial length of the female threaded portion, which is 51 mm, the axial length of the transfer zone being 13.2 mm.

More particularly but not exclusively in the case shown in FIG. 1 in which the female element forms part of a coupling, the invention also encompasses reducing the thickness of said element, in the region facing the contact surfaces 5 and 6, to increase its flexibility. To this end, a depression 13 is formed on the outer peripheral surface 14 of the coupling, said depression having the profile of a large radius concave circular arc (more than 50 mm), in this case equal to 150 mm. This depression defines a minimum external diameter Dm facing a median point P of the transfer zone 5, 6, the external diameter increasing progressively either side of said point. Opposite the free end 15 of the element 2, the depression 13 connects to the cylindrical portion, with a maximum diameter, of the external surface 14. On the free end 15 side, the depression 13 connects to a chamfer 16 adjacent to the end 15. Advantageously, the minimum diameter of said chamfer, i.e. the diameter of element 2 at the junction between the chamfer 16 and the end face 15, is substantially equal to the diameter Dm of the bottom of the depression.

The diameter Dm is also selected so as not to have the bending inertia of the female element in the corresponding plane less than the product of the bending inertia $I_{zz}$ of the regular portion of the tube 11 and the fraction f of the bending moment to be transferred.

While the transfer zone of the invention has been described in combination with a depression on the outer surface of a coupling, the transfer zone can be produced independently of the depression, in particular in the case of a connection which is termed an integral connection in which the male and female elements both form part of great length tubes.

The invention claimed is:

1. A threaded tubular connection for a tubular string that is subjected to dynamic bending loads, comprising:
   a male tubular element including a male threaded portion and a female tubular element including a female threaded portion,
   at least one transfer zone axially disposed between the threaded portions and a free end of one of the tubular elements, while being axially spaced from the threaded portions, wherein a fraction of at least 20% of bending moment, to which the connection is subjected, is transferred from one element to the other,
   the male and female elements including respective transfer surfaces in mutual contact with a radial interference fit in the transfer zone, at least one of the transfer surfaces being an undulated surface having a profile and defining a series of annular rounded ribs that come into interfering contact with the facing transfer surface, points of maximum diameter and minimum diameter of the profile being located on respective rounded portions of the profile, the free end of one of the tubular elements having a front surface free of contact with the other tubular element.

2. A threaded tubular connection for a tubular string that is subjected to dynamic bending loads, comprising:
   a male tubular element including a male threaded portion and a female tubular element including a female threaded portion,
   at least one transfer zone axially disposed between the threaded portions and a free end of one of the tubular elements, while being axially spaced from the threaded portions, wherein a fraction of at least 20% of bending moment, to which the connection is subjected, is transferred from one element to the other,
   the male and female elements including respective transfer surfaces in mutual contact with a radial interference fit in the transfer zone, at least one of the transfer surfaces being an undulated surface having a profile and defining a series of annular rounded ribs that come into interfering contact with the facing transfer surface, points of maximum diameter and minimum diameter of the profile being located on respective rounded portions of the profile, the transfer zone being axially disposed between the threaded portions and the free end of the female element.

3. A threaded connection according to claims 1 or 2, in which the male and female transfer surfaces are lubricated.

4. A threaded connection according to claims 1 or 2, in which the facing transfer surface is a smooth surface, the undulated surface being out of contact with the smooth surface between the ribs.

5. A threaded connection according to claim 4, in which the undulated surface is out of contact with the smooth surface between the ribs.

6. A threaded connection according to claims 1 or 2, in which the undulated surface has a periodic profile with undulations that periodically repeat over the undulated surface.

7. A threaded connection according to claim 6, in which the periodic profile is asymmetric.

8. A threaded connection according to claims 1 or 2, in which the radii of the rounded portions containing the points of maximum diameter and of minimum diameter of the profile are at least equal to 0.4 mm.

9. A threaded connection according to claims 1 or 2, in which the axial distance between two consecutive points of maximum diameter of the profile is at least equal to I mm and in which the axial distance between two consecutive points of minimum diameter of the profile is at least equal to 1 mm.

10. A threaded connection according to claims 1 or 2, in which the radial interference fit is substantially constant from one rib to the other.

11. A threaded connection according to claims 1 or 2, in which the radial interference fit is about 0.4 mm in diameter for a nominal threaded element diameter of 177.8 mm.

12. A threaded connection according to claims 1 or 2, in which the transfer surfaces are in mutual metal/metal sealing contact.

13. A threaded connection according to claims 1 or 2, in which a sealing material in a form of a coating or of an added ring is interposed between the metal surfaces of the male and female elements in the transfer zone.

14. A threaded connection according to claims 1 or 2, in which the male and female transfer surfaces or their envelopes form part of tapered surfaces.

15. A threaded connection according to claims 1 or 2, in which the transfer surfaces or their envelopes are inclined with respect to the axis of connection by an angle between 0.5° and 5°.

16. A threaded connection according to claims 1 or 2, in which the undulated surface has a roughness Ra at most equal to 3.2 micrometers.

17. A threaded tubular connection for a tubular string that is subjected to dynamic bending loads, comprising:
- a male tubular element including a male threaded portion and a female tubular element including a female threaded portion,
- at least one transfer zone axially disposed between the threaded portions and a free end of one of the tubular elements, while being axially spaced from the threaded portions, wherein a fraction of at least 20% of bending moment, to which the connection is subjected, is transferred from one element to the other,
- the male and female elements including respective transfer surfaces in mutual contact with a radial interference fit in the transfer zone, at least one of the transfer surfaces being an undulated surface having a profile and defining a series of annular rounded ribs that come into interfering contact with the facing transfer surface, points of maximum diameter and minimum diameter of the profile being located on respective rounded portions of the profile,
- wherein the two transfer surfaces are undulated surfaces.

18. A threaded connection according to claim 17, in which the ribs of a transfer surface are housed between the ribs of the facing transfer surface.

19. A threaded tubular connection for a tubular string that is subjected to dynamic bending loads, comprising:
- a male tubular element including a male threaded portion and a female tubular element including a female threaded portion,
- at least one transfer zone axially disposed between the threaded portions and a free end of one of the tubular elements, while being axially spaced from the threaded portions, wherein a fraction of at least 20% of bending moment, to which the connection is subjected, is transferred from one element to the other,
- the male and female elements including respective transfer surfaces in mutual contact with a radial interference fit in the transfer zone, at least one of the transfer surfaces being an undulated surface having a profile and defining a series of annular rounded ribs that come into interfering contact with the facing transfer surface, points of maximum diameter and minimum diameter of the profile being located on respective rounded portions of the profile, the profile forming part of the male transfer surface and being defined by a first convex rounded portion containing a point with a maximum profile diameter, by a second concave rounded portion containing a point with a minimum profile diameter and that is tangential to the first rounded portion, and by a third convex rounded portion tangential to the first and second rounded portions and that has a radius substantially larger thereof, starting from the free end of the male element, an axial distance between a maximum profile diameter point and the following minimum diameter point of the profile being less than an axial distance between a minimum profile diameter point and the following maximum diameter point of the profile.

20. A threaded connection according to claim 19, in which the second rounded portion has a larger radius than the first rounded portion.

21. A threaded connection according to claim 19, in which the third rounded portion is located between a minimum profile diameter point and the following maximum diameter point of the profile.

22. A threaded connection according to claims 1 or 2, wherein the transfer zone is made of a material having a yield strength and an axial length such that the transfer zone limits contact pressure resulting from transferring the bending moment to a fraction of the yield strength of the material.

23. A threaded connection according to claim 2, in which the male transfer surface is adjacent to a regular portion of a great length tube at one end of which the male tubular element is formed.

24. A threaded connection according to claim 2, in which the facing transfer surface is a smooth surface, and the undulated surface and the smooth surface form part of the male and female elements respectively.

25. A threaded connection according to claim 2, in which the outer peripheral surface of the female element includes a depression that locally reduces its external diameter facing the transfer zone.

26. A threaded connection according to claim 25, in which the depression has an axially extending concave curvilinear profile facing the transfer zone and each side of the transfer zone, the external diameter being minimal substantially facing a median point of the transfer zone and increasing progressively to each side of the point.

27. A threaded connection according to claim 26, in which the curvilinear concave profile is connected to a chamfer adjacent to the free end of the female element.

28. A threaded connection according to claim 26, in which the minimum external diameter is such that the bending inertia of the female element in the plane along the external surface of the female member at the minimum external point is at least equal to the product of the bending inertia of the regular portion of a great length tube at one end of which the male tubular element is formed and the fraction of the bending moment to be transferred.

29. A threaded connection according to claim 26, in which the concave curvilinear profile has a radius of curvature of at least 50 mm.

30. A threaded connection according to claim 2, in which the female element forms part of a short coupling each end of which is provided with a female threaded element that can receive a male threaded element forming part of a great length tube for connecting the two tubes.

\* \* \* \* \*

UNITED STATES PATENT AND TRADEMARK OFFICE
CERTIFICATE OF CORRECTION

PATENT NO.        : 7,661,727 B2
APPLICATION NO.   : 10/594112
DATED             : February 16, 2010
INVENTOR(S)       : Gabriel Roussie et al.

It is certified that error appears in the above-identified patent and that said Letters Patent is hereby corrected as shown below:

In column 4, line 42, change "d," to --$d_1$--.

Signed and Sealed this

First Day of June, 2010

David J. Kappos
*Director of the United States Patent and Trademark Office*